United States Patent Office 3,776,870
Patented Dec. 4, 1973

3,776,870
PRODUCTION OF BENZOTHIETANE-2-SPIRO-2'-(1',3'-DIAZACYCLOALKANES)
Helmut Hagen, Frankenthal, and Friedrich Becke, Heidelberg, Germany, assignors to Badische Anilin- & Soda-Fabrik Aktiengesellschaft, Ludwigshafen (Rhine), Germany
No Drawing. Filed July 2, 1971, Ser. No. 159,497
Claims priority, application Germany, July 15, 1970,
P 20 34 987.5
Int. Cl. C07d 51/36
U.S. Cl. 260—25 R          10 Claims

ABSTRACT OF THE DISCLOSURE

Benzothietane-2-spiro-2'-(1',3' - diazacycloalkanes) by reaction of o-halobenzaldehyde compounds with diaminoalkanes and sulfur and the benzothietane-2-spiro-2'-(1',3'-diazacycloalkanes) themselves. The compounds which can be prepared by the process of the invention, such as benzothietane-2-spiro-2'-imidazolidine and its derivatives substituted in the 4'-position by methyl and/or the 4-position by chlorine or benzothietane-2-spiro-2'-hexahydropyrimidine and its derivative substituted in the 4-position by chlorine, are auxiliaries for the textile and rubber industries, plant protection agents and valuable starting materials for the production of plant protection agents and dyes.

---

This invention relates to a process for the production of new benzothietane-2-spiro-2'-(1',3'-diazcycloalkanes) by reaction of an o-halobenzaldehyde compound with a diaminoalkane and sulfur.

The invention also relates to the new benzothietane-2-spiro-2'-(1',3'-diazacycloalkanes) themselves.

We have found that benzothietane-1-spiro-2'-(1',3'-diazacycloalkanes) having the general formula:

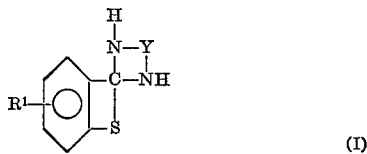

(I)

where $R^1$ denotes a hydrogen atom, a halogen atom or an aliphatic radical;
Y denotes the radical

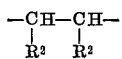

or the radical

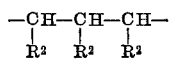

and the individual radicals $R^2$ may be identical or different and each denotes a hydrogen atom or an aliphatic radical, are obtained advantageously by reacting an o-halobenzaldehyde compound having the general formula:

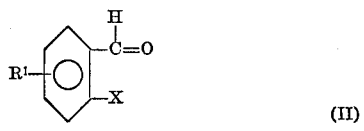

(II)

or the general formula:

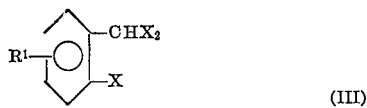

(III)

in which $R^1$ has the meanings given above and X denotes a halogen atom, with a diaminoalkane having the general formula:

$$H_2N-Y-NH_2 \quad (IV)$$

in which Y has the meanings given above, and with elementary sulfur.

The reaction according to the invention may be represented as follows when o-chlorobenzaldehyde and ethylenediamine are used:

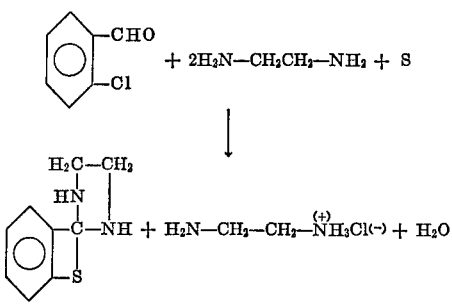

The reaction may be represented by the following formulae when o-chlorobenzal chloride, ethylenediamine and elementary sulfur are reacted:

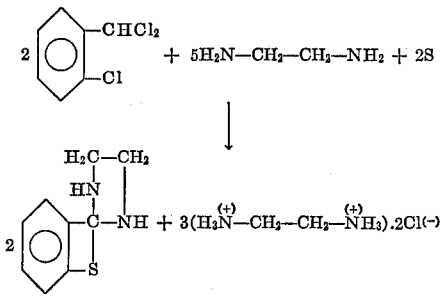

The process of the invention provides the new benzothietane-2-spiro-2' - (1'3,' - diazacycloalkanes) in good yields and high purity.

Starting material (II) or (III) is as a rule reacted with starting material (IV) and elementary sulfur in stoichiometric amount. Starting material (IV) and/or sulfur may however be used in excess, for example up to twice the amount of the stoichiometric ratio with reference to starting material (II) or (III).

Preferred starting materials (II), (III) and (IV) and accordingly preferred end products (I) are those in whose formulae $R^1$ denotes a hydrogen, bromine or chlorine atom or an alkyl radical having one to seven carbon atoms, Y denotes the radical

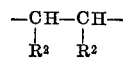

or the radical

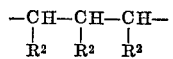

the individual radicals $R^2$ are identical or different and each denotes a hydrogen atom or an alkyl radical having one to four carbon atoms, and X denotes a bromine or chlorine atom. The said radicals may bear, as substituents, groups which are inert under the reaction conditions, for example alkyl groups having one to four carbon atoms.

Examples of suitable starting materials (II) and (III) are: o-chlorobenzaldehyde, 2,5-dichlorobenzaldehyde, 2-bromobenzaldehyde, 2-chloro-5-bromobenzaldehyde, 2-chloro-6-methylbenzaldehyde, and 2-bromo-4-isobutylbenzaldehyde; analogous benzal chlorides and bromides may also be used.

The following diaminoalkanes are examples of suitable starting materials (IV): 1,2-diaminoethane, 1,2-diaminopropane, 3,4-diaminohexane, 2,3-diaminobutane, 1,3-diaminopropane, 1,3-diaminobutane, 1,3-diamino-2-ethylhexane, 1,2-diaminobutane, 1,2-diamino-2-ethylhexane, and 1,2-diamino-1,2,3,4-tetramethylbutane.

The reaction is carried out as a rule at a temperature of 60° to 180° C., preferably from 100° to 140° C., at atmospheric or superatmospheric pressure, continuously or batchwise. It is advantageous to use organic solvents which are inert under the reaction conditions, for example aromatic hydrocarbons such as benzene or toluene; alkanols such as methanol, ethanol, propanol or a butanol; glycol ethers such as glycol monomethyl ether or glycol monoethyl ether; or suitable mixtures. A ratio of from 5 to 20 moles of solvent per mole of starting material (II) or (III) is preferred.

The reaction may be carried out as follows: Starting material (II) or (III) and starting material (IV), with or without a solvent, are heated to the reaction temperature and then elementary sulfur is added. The mixture is allowed to react for another ten to fifteen hours at the reaction temperature. The end product is separated by a conventional method, for example by crystallization and filtration of the mixture. The diaminoalkane hydrohalide formed is removed by washing with water. The end product may be purified by recrystallization if necessary.

The new compounds which can be prepared by the process of the invention are auxiliaries for the textile and rubber industries, plant protection agents and valuable starting materials for the production of plant protection agents and dyes. For example after quaternization with dimethyl sulfate, an antistatic finish can be achieved on synthetic fibrous material, for example of polyester or polyamide fibers. Moreover the substances according to the invention, when applied at the rate of from 5 to 50 g. per kg. of fibrous material by a conventional finishing method, impart to the finished textile material not only an antistatic effect but also a soft or firm handle depending on the constitution of the compound. For example polyester piece goods can be impregnated with an aqueous impregnating liquor of the said concentration at a temperature of from 15° to 40° C. and dried. Moreover benzothietane-spiro-imidazolidine (I) exhibits a very good accelerating effect in the vulcanization of natural rubber with sulfur. Heating in stages is carried out at 143° C. and 181° C. with the mixture:

| | |
|---|---|
| Smoked sheets | 100 |
| Carbon black | phr.. 40 |
| ZnO | phr.. 5 |
| Softener based on petroleum distillate | phr.. 3 |
| Sulfur | phr.. 2 |
| End product | phr.. 2 |

It is found that end product (I) has very good vulcanization properties. The tensile strength (kg./cm.$^2$), the elongation at break (percent) and the Shore hardness are better than or equal to those of dibenzothiazyl disulfide; aging behavior is clearly better.

The following examples illustrate the invention. The parts given in the following examples are parts by weight.

EXAMPLE 1

60 parts of ethylenediamine is heated in 500 parts of glycol monoethyl ether at 50° C. in a stirred vessel. 70 parts of o-chlorobenzaldehyde is added to this mixture and the whole is heated to 100° C. 16 parts of sulfur is added and the temperature is raised to 130° C. The reaction mixture is then stirred for another fourteen hours at refluxing temperature, cooled and the deposited pale yellow solid is suction filtered. 61 parts of benzothietane-2-spiro-2'-imidazolidine is obtained having a melting point of 247° to 248° C. Another 10 parts of end product can be isolated from the filtrate by distilling off the solvent, washing the residue with water and recrystallizing it from methanol. The total yield is equivalent to 80% of theory.

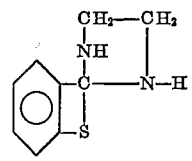

EXAMPLE 2

74 parts of 1,2-diaminopropane, 70 parts of o-chlorobenzaldehyde and 16 parts of sulfur are reacted in 500 parts of glycol monoethyl ether in a stirred vessel as described in Example 1.

After cooling, the solvent is completely distilled off in vacuo; the viscous residue is washed twice, each time with 400 parts of water. A pale yellow crystalline solid is thus formed. The solid is suction filtered sharply, 500 parts of ether is added, and the whole is heated, filtered and dried. 76 parts of benzothietane-2-spiro-2'-(4'-methylimidazolidine) is obtained having a melting point of 160° to 161° C. This is equivalent to 79% of theory.

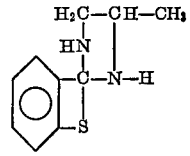

EXAMPLE 3

74 parts of 1,3-diaminopropane, 70 parts of o-chlorobenzaldehyde and 16 parts of sulfur are reacted in 500 parts of glycol monoethyl ether and worked up as described in Example 1. 68 parts of benzothietane-2-spiro-2'-hexahydro-pyrimidine is obtained having a melting point of 244° C. This is equivalent to a yield of 71% of theory.

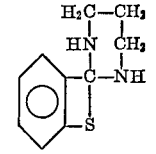

EXAMPLE 4

44 parts of 2,5-dichlorobenzaldehyde, 33 parts of ethylenediamine and 8 parts of sulfur is reacted in 500 parts of glycol monoethyl ether in a stirred vessel as described in Example 1. The reaction mixture is then cooled to about 5° C. An intense yellow solid is precipitated. It is suction filtered, washed with water and dried. 35 parts of 4-chlorobenzothietane-2-spiro-2'-imidazolidine is obtained having a melting point of 243° to 244° C. The yield is equivalent to 66% of theory.

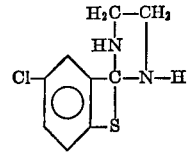

EXAMPLE 5

44 parts of 2,5-dichlorobenzaldehyde, 38 parts of 1,3-diaminopropane and 8 parts of sulfur are reacted as described in Example 1 in 500 parts of glycol monoethyl ether. The solvent is then distilled off in vacuo. Water is added to the residue which is suction filtered and recrystallized from ethanol. 32 parts of 4-chlorobenzothietane-2-spiro-2'-hexahydropyrimidine is obtained having a melting point of 232° to 233° C. The yield is equivalent to 57% of theory.

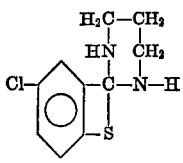

EXAMPLE 6

44 parts of 2,5-dichlorobenzaldehyde, 38 parts of 1,2-diaminopropane and 8 parts of sulfur are reacted in 400 parts of glycol monoethyl ether as described in Example 5. 43 parts of 4-chlorobenzothietane-2-spiro-2'-(4'-methylimidazoline) is obtained having a melting point of 172° to 173° C. This is equivalent to a yield of 78% of theory.

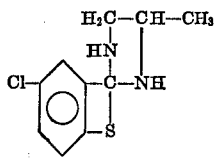

EXAMPLE 7

49 parts of o-chlorobenzal chloride is heated in a stirred vessel with 8 parts of sulfur and 60 parts of ethylenediamine in 500 parts of isobutanol for eighteen hours at 110° to 115° C. The whole is cooled and the deposited solid is suction filtered, washed with water and dried. 37 parts of benzothietane-2-spiro-2'-imidazolidine is obtained having a melting point of 244° to 246° C. This is equivalent to a yield of 83% of theory.

We claim:

1. A process for the production of a benzothietane-2-spiro-2'-(1',3'-diazacycloalkane) having the formula:

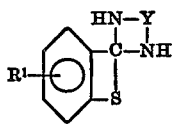 (I)

in which $R^1$ denotes hydrogen, halogen or alkyl of one to seven carbon atoms, Y denotes the radical

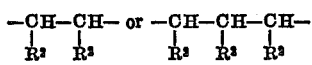

wherein each $R^2$ denotes hydrogen or alkyl of one to four carbon atoms, which process comprises reacting a o-halobenzaldehyde compound having one of the formulae:

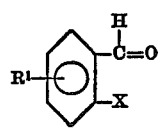 (II)

and

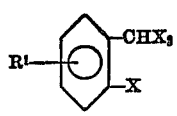 (III)

in which $R^1$ has the meanings given above and X denotes halogen, with a diaminoalkane having the formula:

$$H_2N—Y—NH_2 \quad (IV)$$

in which Y haes the meanings given above, and with elementary sulfur at a temperature of about 60° C. to 180° C.

2. A process as claimed in claim 1 wherein the reaction is carried out at a temperature of 100° C. to 140° C.

3. A process as claimed in claim 1 wherein the reactants are used in a stoichiometric amount or with an excess of the diaminoalkane or the sulfur of up to twice the stoichiometric amount.

4. A process as claimed in claim 1 wherein the reaction is carried out in the presence of an organic solvent which is inert under the reaction conditions.

5. A process as claimed in claim 4 wherein said solvent is present in an amount of about 5 to 20 moles per mole of the reactant (II) or (III).

6. A compound of the formula

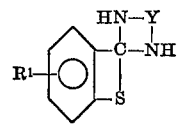

wherein $R^1$ denotes hydrogen, bromine, chlorine or alkyl of one to seven carbon atoms and Y denotes one of the radicals

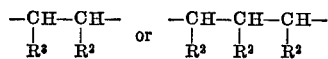

in which $R^2$ denotes hydrogen or alkyl of one to four carbon atoms.

7. A compound as claimed in claim 6 wherein $R^1$ is hydrogen or chlorine and Y is ethylene or propylene.

8. The compound

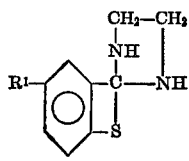

in which $R^1$ is hydrogen or chlorine.

9. The compound

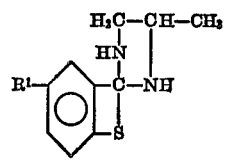

in which $R^1$ is hydrogen or chlorine.

10. The compound

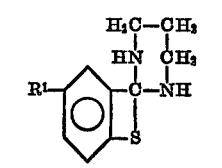

in which $R^1$ is hydrogen or chlorine.

References Cited

UNITED STATES PATENTS 3,631,046 12/1971 Hardtmann _____ 260—256.4

ALEX MAZEL, Primary Examiner

R. V. RUSH, Assistant Examiner

U.S. Cl. X.R.

8—115.6; 71—90; 260—309.7, 791